(12) United States Patent
Lee et al.

(10) Patent No.: US 7,858,132 B2
(45) Date of Patent: Dec. 28, 2010

(54) PROCESS FOR PREPARING COOKED RICE IN ASEPTIC PACKAGE MADE OF LONG GRAIN HAVING PROPERTY OF FLUFFINESS

(75) Inventors: Changyong Lee, Jeju-si (KR); Sangyou Kim, Pusan (KR)

(73) Assignee: CJ Cheiljedang Corp., Seoul (KR)

( * ) Notice: Subject to any disclaimer, the term of this patent is extended or adjusted under 35 U.S.C. 154(b) by 328 days.

(21) Appl. No.: 10/691,781

(22) Filed: Oct. 23, 2003

(65) Prior Publication Data
US 2004/0156962 A1    Aug. 12, 2004

(30) Foreign Application Priority Data
Feb. 10, 2003    (KR)    ........... 10-2003-0008314

(51) Int. Cl.
*B65B 55/06*    (2006.01)
(52) U.S. Cl. .............. 426/392; 426/615; 426/508; 426/438; 426/521
(58) Field of Classification Search ........... 426/106, 426/392, 417, 615, 506, 509, 510, 626, 438
See application file for complete search history.

(56) References Cited

U.S. PATENT DOCUMENTS

| | | | | |
|---|---|---|---|---|
| 3,840,685 | A | * | 10/1974 | Lyall et al. ............ 426/618 |
| 3,892,058 | A | * | 7/1975 | Komatsu et al. ........... 53/425 |
| 4,539,212 | A | * | 9/1985 | Hunter .................... 426/325 |
| 4,741,911 | A | * | 5/1988 | McIntyre et al. ........ 426/325 |
| 6,139,898 | A | * | 10/2000 | Meyer et al. ............ 426/618 |

FOREIGN PATENT DOCUMENTS

| | | |
|---|---|---|
| KR | 1019940012035 | 5/1994 |
| KR | 1019970053839 | 10/1997 |

OTHER PUBLICATIONS

The American Heritage Dictionary of the English Language, Fourth Edition; plastic, 2000 Houghton Mifflin Co. Reference obtained from Dictionary.com/plastic, p. 1.*
The World's Healthiest Foods: Feeling Great: Rice, brown. 2002. http://www.whfoods.com/genpage.php?tname=foodspice&dbid=128. pp. 1-13. Date obtained from http://web.archive.org.*
Bittman, Mark. How to Cook Everything, Wiley 1998, pp. 181, 182, 197-199, and 207.*

* cited by examiner

*Primary Examiner*—Kelly Bekker
(74) *Attorney, Agent, or Firm*—Porzio, Bromberg & Newman, P.C.

(57) ABSTRACT

This invention relates to a process for preparing cooked rice in aseptic package made of long grain rice, not having property of glutinousness but having fluffiness and smooth mouthfeel. More particularly, the invention relates to a process for preparing cooked rice in aseptic package prepared by a process comprising soaking long grain rice in solution of emulsified oil, filling the rice automatically in a heat-resisting plastic container, sterilizing the rice 4~10 times repeatedly for 4~8 seconds at high temperature of 130~150° C. and high pressure, cooking said sterilized long grain rice in a measured amount of liquid, and packaging the resultant cooked rice in aseptic so that cooked rice which is free from microorganism and capable of long term preservation (more than 6 months) can be obtained.

1 Claim, 1 Drawing Sheet

Figure 1:
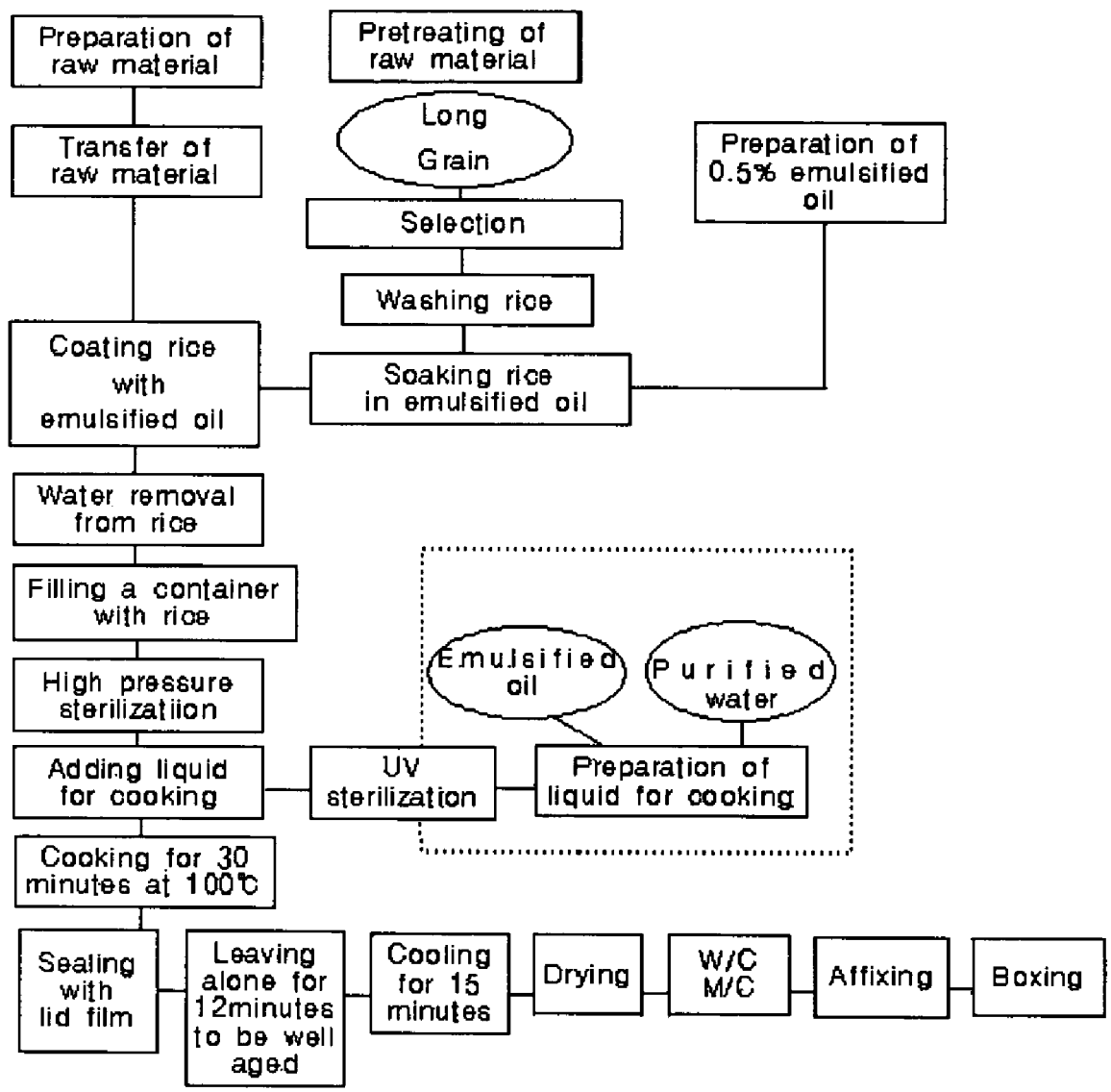

PROCESS FOR PREPARING COOKED RICE IN ASEPTIC PACKAGE MADE OF LONG GRAIN HAVING PROPERTY OF FLUFFINESS

BACKGROUND OF THE INVENTION

1. Field of the Invention

The invention relates to a process for preparing cooked rice in aseptic package made of long grain rice with excellent fluffiness. More particularly, the invention relates to a process for preparing cooked rice in aseptic package prepared by a process comprising soaking long grain rice in solution of emulsified oil, filling the rice automatically in a heat resisting plastic container, sterilizing the rice 4~10 times repeatedly for 4~8 seconds at high temperature of 130~150° C. and high pressure, cooking said sterilized long grain rice in a measured amount of liquid under fixed conditions, and packaging the resultant cooked rice in aseptic so that cooked rice which is free from microorganism and capable of long term preservation (more than 6 months) can be obtained.

2. Description of the Prior Art

Rice grain is classified into four types based on its length and width by International Rice Research Institute (IRRI). According to classification by IRRI, extra long grain is more than 7.51 mm long, long grain is 6.61~7.5 mm long, medium grain is 5.51~6.60 mm long, and short grain is less than 5.50 mm long. And according to classification by FAO, extra long grain is more than 7.0 mm long, long grain is 6.0~6.99 mm long, medium grain is 5.0~5.99 mm long and short grain is less than 5.0 mm long. The grain shape refers to the grain length to width ratio and is categorized as slender (ratio more than 3.0), medium (ratio between 2.0~3.0), round (ratio less than 2.0).

It is long grain produced most in the world and long grain is typically "Indica Rice", which has much fluffiness and is crumbly when cooked. So, the rice is not suitable for staple food (in Korea, Japan or China etc) but suitable for one-dish meals for example curried rice and omelet rice. It is mainly produced in Philippine, Indonesia, China areas south of the Yangtze River and South America (Arkansas, Louisiana).

Medium grain and short grain have similar characteristics and they are typically "Japonica Rice", produced in Korea, Japan, Italy, America California and Egypt, which have much glutinousness.

In general, rice is composed of 90% starch, 7.9% protein and small amount of lipids. Rice starch is amylose and amylopectin. Japonica rice contains 15~17% of amylose, while Indica rice contains 25~27% of amylose, that means less amylose result in much glutinousness.

Long grain has high amylose content and thick cell membrane of starch, which causes no destruction of cell wall during cooking. Therefore, cooked rice using long grain has much fluffiness and it is not suitable for Korean's taste. But the majority of rice varieties produced and used are long grain.

When cooked rice in aseptic package is produced by the method disclosed by the Korean patent application No. 1996-062376, it shows many differences in quality, compared to cooked rice produced at home by general method. The property of long grain not having glutinousness but having fluffiness doesn't remain on cooked rice in aseptic package. It results from destruction of starch cell membrane and pasting of starch during sterilization at high temperature and high pressure.

U.S. Pat. No. 6,139,898 describes a process for producing cooked rice keeping fixed water content by coating rice surface with oil.

Generally, cooked rice is prepared by a process comprising adding measured amount of water to rice and heating at about 100° C. for about more than 30 min. About $10^2$~$10^4$ cfu/g of microorganisms exist on surface of rice. And general cells of microorganism are destructed but heat-resisting spore are not destructed perfectly. Such propagation of heat-resisting microorganism is a serious problem in long-term preservation of cooked rice at room temperature.

SUMMARY OF THE INVENTION

It is the object of the present invention to provide a manufacturing process for preparing cooked rice in aseptic package which is capable of long-term preservation and has good taste.

BRIEF DESCRIPTION OF THE INVENTION

FIG. 1 illustrates flow chart of a process for preparing cooked rice in aseptic package.

DETAILED DESCRIPTION OF THE INVENTION

To achieve the above object, the present invention provides a process for preparing cooked rice in aseptic package prepared by a process comprising soaking long grain rice in solution of emulsified oil, filling the rice automatically in a heat resisting plastic container, sterilizing the rice 4~10 times repeatedly for 48 seconds at high temperature of 130~150° C. and high pressure, cooking said sterilized long grain rice in a measured amount of liquid in fixed condition, and packaging the resultant cooked rice in aseptic so that cooked rice which is free from microorganism and capable of long-term preservation and has good taste.

In a first step, long grain rice is washed with purified water to remove impurities and then soaked in 0.5% solution of emulsified oil for 2~3 minutes to coat the ingredient of emulsified oil.

Preferably, glycerin fatty acid ester, D-sorbitol fatty acid ester, polyglycerin fatty acid ester, propyleneglycol fatty acid ester, ilshin ester 100, 600 or 700 is used as the emulsified oil and more preferably, emulsified oil containing natural materials is used.

Preferably, long grain is 6.0~6.99 mm long and contains 24~27% of amylose. Thereafter, water is removed from the rice and the rice is filled in a heat-resisting plastic container.

The plastic container filled with the rice is heated 8 times for 4.5 seconds at more than 140° C. to sterilize. Since sterilization under harsh conditions may cause the product to have lower quality, the sterilization conditions must be controlled properly.

0.7% Solution of emulsified oil, as liquid for cooking rice, is added to the resultant sterilized long grain rice. The container filled with rice and the solution of emulsified oil is heated by steam for 30 minutes at 100° C. to cook. The rice is coated with the solution of emulsified oil while cooking. The resultant cooked rice coated with the solution of emulsified oil has property of fluffiness.

After the rice is cooked, it is hermetically sealed with lid film in clean room (at least class 100 or better clean room), aged, cooled and dried so as to obtain resultant cooked rice in aseptic package.

The process for preparing cooked rice in aseptic package is described on FIG. 1.

EXAMPLE 1

1,000 g of long grain rice was washed 5 times with water and soaked in water for 1 hour. Thereafter, water was removed from the rice by putting it on dense net.

After removing the water, 90 g of the rice was filled in a heat-resisting container each and put into high temperature high pressure steam sterilizer (manufactured by Shinwa co., Korea) hermetically and sterilized with high pressure steam at 140~143° C. for 6 seconds. The sterilization with steam at high temperature was repeated 7 times more. After the high temperature steam sterilization, 1.0% Emulsified oil solution in an amount of 150 g was added to the each container having been sterilized, as liquid for cooking rice and the rice in the container with the emulsified oil solution was cooked for 30 minutes keeping steam temperature of 100° C. After the rice has been cooked, it was hermetically sealed with lid film under aseptic conditions and left alone for 12 minutes to be well aged and then cooled in 10° C. water for 15 minutes to finish manufacturing process.

EXAMPLE 2

1,000 g of long grain rice was washed 5 times with water and soaked in water for 1 hour. Thereafter, water was removed from the rice by putting it on dense net.

After removing the water, 90 g of the rice was filled in a heat-resisting container each and put into high temperature high pressure steam sterilizer (manufactured by Shinwa co.) hermetically and sterilized with high pressure steam at 140~143° C. for 4.5 seconds. The sterilization with steam at high temperature was repeated 7 times more. After the high temperature steam sterilization, 1.0% Solution of emulsified oil in an amount of 150 g was added to the each container having been sterilized, as liquid for cooking rice and the rice in the container with the solution of emulsified oil was cooked for 30 minutes keeping steam temperature of 100° C. After the rice has been cooked, it was hermetically sealed with lid film under aseptic conditions and left alone for 12 minutes to be well aged and then cooled in 10° C. water for 15 minutes to finish manufacturing process.

EXAMPLE 3

1,000 g of long grain rice was washed 5 times with water and soaked in water for 1 hour. Thereafter, water was removed from the rice by putting it on dense net. After removing the water, 90 g of the rice was filled in a heat-resisting container each and 1.0% solution of emulsified oil in an amount of 150 g was added to the each container, as liquid for cooking rice, and the rice in the container with the solution of emulsified oil was cooked for 30 minutes keeping steam temperature of 100° C. After the rice has been cooked, it was hermetically sealed with lid film under aseptic conditions and left alone for 12 minutes to be well aged and then cooled in 10° C. water for 15 minutes to finish manufacturing process.

EXAMPLE 4

1,000 g of long grain rice was washed 5 times with water and soaked in 0.5% solution of emulsified oil for 3 minutes. Thereafter, water was removed from the rice by putting it on dense net.

After removing the water, 90 g of the rice was filled in a heat-resisting container each and put into high temperature high pressure steam sterilizer (manufactured by Shinwa co.) hermetically and sterilized with high pressure steam at 140~143° C. for 4.5 seconds. The sterilization with steam at high temperature was repeated 7 times more. After the high temperature steam sterilization, 0.7% Solution of emulsified oil in an amount of 150 g was added to the each container having been sterilized, as liquid for cooking rice and the rice in the container with the solution of emulsified oil was cooked for 30 minutes keeping steam temperature of 100° C. After the rice has been cooked, it was hermetically sealed with lid film under aseptic conditions and left alone for 12 minutes to be well aged and then cooled in 10° C. water for 15 minutes to finish manufacturing process.

EXAMPLE 5

1,000 g of long grain rice was washed 5 times with water and soaked in 0.5% solution of emulsified oil for 3 minutes. Thereafter, water was removed from the rice by putting it on dense net.

After removing the water, 90 g of the rice was filled in a heat-resisting container each and put into high temperature high pressure steam sterilizer (manufactured by Shinwa co.) hermetically and sterilized with high pressure steam at 140~143° C. for 4.5 seconds. The sterilization with steam at high temperature was repeated 7 times more. After the high temperature steam sterilization, 1.0% Solution of emulsified oil in an amount of 150 g was added to the each container having been sterilized, as liquid for cooking rice, and the rice in the container with the solution of emulsified oil was cooked for 20 minutes keeping steam temperature of 100° C. After the rice has been cooked, it was hermetically sealed with lid film under aseptic conditions and left alone for 12 minutes to be well aged and then cooled in 10° C. water for 15 minutes to finish manufacturing process.

EXAMPLE 6

1,000 g of long grain rice was washed 5 times with water and soaked in 0.5% solution of emulsified oil for 3 minutes. Thereafter, water was removed from the rice by putting it on dense net.

After removing the water, 90 g of the rice was filled in a heat-resisting container each and put into high temperature high pressure steam sterilizer (manufactured by Shinwa co.) hermetically and sterilized with high pressure steam at 140~143° C. for 4.5 seconds. The sterilization with steam at high temperature was repeated 7 times more. After the high temperature steam sterilization, 1.0% Solution of emulsified oil in an amount of 150 g was prepared as liquid for cooking rice and 75 g of the solution was added before cooking to the each container having been sterilized and the rice in the container with the solution of emulsified oil was cooked for 30 minutes keeping steam temperature of 100° C. After cooking, the rest of the solution (75 g) was added and it was hermetically sealed with lid film under aseptic conditions and left alone for 12 minutes to be well aged and then cooled in 10° C. water for 15 minutes to finish manufacturing process.

Differences of manufacturing process between said example 1~6 are described in table 1 to sum up.

TABLE 1

| Examples | Soaking Time | Soaking Treatment of emulsified oil | Soaking Concentration of emulsified oil in solution | Sterilization Temperature (° C.) | Sterilization Time (sec.) | Sterilization Repeat | Cooking Concentration of emulsified oil in solution (%) | Cooking Time (min.) | Adding emulsified oil |
|---|---|---|---|---|---|---|---|---|---|
| 1 | 1 hour | X | — | 140~143 | 6 | 8 | 1.0 | 30 | 1 time |
| 2 | 1 hour | X | — | 140~143 | 4.5 | 8 | 1.0 | 30 | 1 time |
| 3 | 1 hour | X | — | — | — | — | 1.0 | 30 | 1 time |
| 4 | 3 minutes | ○ | 0.5% | 140~143 | 4.5 | 8 | 0.5 | 30 | 1 time |
| 5 | 3 minutes | ○ | 0.5% | 140~143 | 4.5 | 8 | 0.5 | 20 | 1 time |
| 6 | 3 minutes | ○ | 0.5% | 140~143 | 4.5 | 8 | 0.5 | 30 | 2 times |

EXPERIMENTAL EXAMPLE 1

To evaluate products manufactured under different conditions, sensory tests for products by said examples were carried out by twenty exercised panelists. The sensory test was conducted at four items such as appearance, softness, fluffiness and synthetic evaluation. In the sensory test, the quality of each cooked rice made of long grain was evaluated in 5 grades in accordance with the following criteria and expressed in the average (5: Very good, 4: Good, 3: Moderate, 2: Bad, 1: Very bad). The results of sensory test are shown in Table 2.

TABLE 2

| Examples | Appearance | Softness | Fluffiness | Synthetic evaluation |
|---|---|---|---|---|
| 1 | 3.2 | 3.1 | 2.8 | 3.0 |
| 2 | 3.4 | 3.3 | 3.3 | 3.3 |
| 3 | 2.8 | 3.0 | 2.5 | 2.8 |
| 4 | 3.5 | 3.8 | 3.9 | 3.8 |
| 5 | 3.6 | 3.8 | 4.0 | 3.9 |
| 6 | 3.6 | 3.6 | 3.7 | 3.7 |

According to the result of sensory test for products by said examples, fluffiness can't be improved by the existing process of manufacturing cooked rice in aseptic package. By reduction of soaking time and applying solution of emulsified oil to soaking process, which was used for cooking process only, cooked rice in aseptic package having property of fluffiness can be produced.

The property of glutinousness results from destruction of starch cell membrane during sterilization at high temperature and high pressure by water which is absorbed into the rice during soaking and pasting of starch during cooking process.

Examples 5 and 6 are different in cooking time, but there is no significant difference, therefore 30 minutes of cooking time is selected for a process of manufacturing cooked rice in aseptic package made of long grain.

EXPERIMENTAL EXAMPLE 2

Sensory tests for the cooked rice in aseptic package produced by the method of the invention and the cooked rice produced by the general method at home were carried out by fifty Americans.

The sensory test was conducted by the method of relative comparison of two-cooked rice at ten items such as appearance of the rice, color of rice, flavor of the rice, moistness of the rice, texture of the rice, fluffiness of the rice, size of the rice grains and purchase intention.

In the sensory test, the quality of each of cooked rice was evaluated in 5 grades in accordance with the following criteria and expressed in the average. The results of sensory test are shown in Table 3.

TABLE 3

| Caucasian - Hedonic | | White Rice A | White Rice B |
|---|---|---|---|
| Appearance of the rice | Top2 (%) | 62% | 56% |
| | Mean | 3.8 | 3.5 |
| Color of the rice | Top2 (%) | 76% | 48% |
| | Mean | 4.1% | 3.3% |
| Flavor of the rice | Top2 (%) | 48% | 60% |
| | Mean | 3.2 | 3.4 |
| Moistness of the rice | Top2 (%) | 68% | 68% |
| | Mean | 3.8 | 3.7 |
| Texture of the rice | Top2 (%) | 56% | 66% |
| | Mean | 3.5 | 3.7 |
| Fluffiness of the rice | Top2 (%) | 60% | 68% |
| | Mean | 3.7 | 3.8 |
| Size of the rice grains | Top2 (%) | 60% | 76% |
| | Mean | 3.7 | 4.1 |
| Amount of salt | Top2 (%) | — | — |
| | Mean | — | — |
| Purchase Intention | Top2 (%) | 46% | 54% |
| | Mean | 3.0 | 3.3 |

*A: cooked rice in aseptic package made of long grain produced by the method of the invention B: cooked rice made of long grain produced by the general method at home.
*5: Very good, 4: Good, 3: Moderate, 2: Bad, 1: Very bad
*"Top two" is the value that the mean percentage of marked 4 to 5 in the five grades sensory tests.

According to the results of sensory test, there was no significant difference between the cooked rice in aseptic package and the cooked rice produced by general method at home, in point of moistness, texture and fluffiness. That means the cooked rice produced by the method of the invention has property of fluffiness equal with the cooked rice produced by the general method at home. The invention relates to a process for preparing cooked rice in aseptic package made of long grain rice, and according to the invention, cooked rice in aseptic package not having property of glutinousness but having fluffiness and smooth mouthfeel can be obtained.

Moreover, cooked rice in aseptic package which is free from microorganism and capable of long-term preservation (more than 6 months) can be obtained. And there is no significant difference between the quality of cooked rice in aseptic package and that of cooked rice produced by general method at home. And cooked rice in aseptic package is superior to cooked rice produced by general method at home, in point of appearance and color.

What is claimed is:

1. A process for preparing cooked rice in an aseptic package which comprises the sequential steps of:
    washing long grain rice with only purified water;
    soaking the long grain washed rice with the purified water and with a first solution of emulsified oil for two to three minutes, said emulsified oil is selected from glycerin fatty acid ester, D-sorbitol fatty acid ester, polyglycerin fatty acid ester, propyleneglycol fatty acid ester and ilshin ester;
    removing the purified water from the long grain rice;
    filling the soaked long grain rice automatically in a heat-resisting plastic container;
    repeating 4 to 10 times sterilization of the container filled with the long grain rice by applying high pressure steam at a temperature of 130° C.-150° C. and for 4 to 8 seconds each time;
    making a second solution of emulsified oil;
    adding half of the second solution of emulsified oil to the sterilized rice before the step of cooking the rice;
    cooking the long grain rice with said half of the second solution of emulsified oil as a liquid for cooking; and
    adding the remaining portion of the second solution of emulsified oil to the cooked long grain rice, and
    hermetically sealing the plastic container under aseptic conditions and packaging the resultant cooked rice.

* * * * *